Oct. 31, 1972 M. DE ROSSI 3,701,684
ZINC-ZINC HALIDE STORAGE BATTERY
Filed Dec. 29, 1969
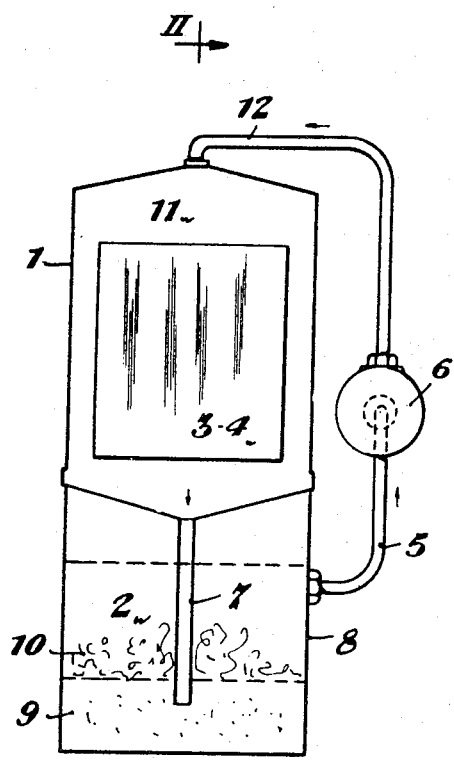
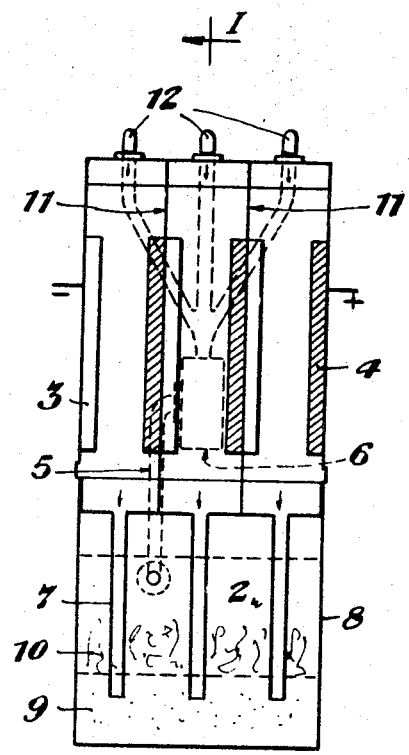
INVENTOR
MARIO DE ROSSI,
BY Kimmel, Crowell & Weaver
ATTORNEYS United States Patent Office 3,701,684
Patented Oct. 31, 1972

3,701,684
ZINC-ZINC HALIDE STORAGE BATTERY
Mario De Rossi, Rome, Italy, assignor to Consiglio
Nazionale Delle Ricerche, Rome, Italy
Continuation-in-part of application Ser. No. 742,331,
July 3, 1968. This application Dec. 29, 1969,
Ser. No. 888,986
Claims priority, application Italy, May 2, 1968,
36,679/68
Int. Cl. H01m 43/02
U.S. Cl. 136—30                    5 Claims

ABSTRACT OF THE DISCLOSURE

Prior art electric storage batteries of the zinc-zinc halide aqueous solution type with a soluble cathode and a dissolved anode in circulating electrolyte are improved by (1) adding salts such as $NH_4Cl$ and $Cs_2SO_4$ which have very mobile ions capable of assuring good electrical conductivity, which are soluble in the aqueous electrolyte and which react with the zinc halide to obtain a zinc salt and a metallic halide both of which are only slightly soluble thereby giving a precipitate and (2) adding an organic solvent, insoluble in water.

This application is a continuation-in-part application of U.S. application Ser. No. 742,331, filed July 3, 1968, Mario de Rossi, now abandoned.

BACKGROUND OF THE INVENTION

This invention is concerned with an electric storage battery containing zinc halide in aqueous solution, a battery of the type having a soluble cathode and a dissolved anode. In order to obtain a high energy and a high power to weight ratio, it has been known to use an electromotive system in which the cathode is soluble and the anode is dissolved in the electrolyte (the utilization coefficient of the active cathodic and anodic materials approaches unity). With such an electromotive system one produces storage batteries in which each element thereof comprises:

A cathode consisting of a soluble metal immersed in:
An electrolytic aqueous solution of one of its salts,
An anode dissolved in the electrolyte, this anode consisting of the mass of the metalloid which forms the above mentioned salt, and
A nonreactive electrode immersed in the electrolyte to complete the circuit.

In each element the electromotive process takes place according to the following schematic reaction:

$$Me^-|MeX+X+H_2O|Nonreactive\ electrode+$$

following these reversible reactions:

at the cathode: $Me \rightarrow nMe^+ + ne$
in the electrolyte: $X + ne \rightarrow nX^-$
totally: $Me + X \rightarrow MeX$ where:

Me=metal
n=valence number of Me
$Me^+$=ion of metal
$X^-$=anion of salt
e=one electron charge
MeX=salt dissolved in an aqueous solvent.

In such an electromotive system the cathode may be zinc and the electrolyte an aqueous solution of a zinc halide.

The zinc-zinc halide system has several disadvantages.
The first disadvantage is that aqueous solutions of zinc halide (or of the halide of any electronegative metal) do not have an electrical conductivity which allows high voltage currents to flow. In order to obtain these higher voltages, one must increase the amount of aqueous solvent present. This is obviously incompatible with the objective of a high power to weight ratio.

A second disadvantage is the high density gradient which forms in the electrolyte. This causes lack of uniformity in zinc deposition during successive recharges of the battery and enhances the chances of internal short circuits in the battery elements.

A third disadvantage is the danger of zinc corrosion (even with an open circuit) caused by the aqueous solution having a high concentration of halide.

Methods have been proposed to avoid the second and third disadvantages described above. This is done by avoiding contact between the zinc and the electrolyte when the battery elements are not in use and by providing circulation for the electrolyte in the elements while they are functioning (to avoid the formation of density gradients). There still remains, however, one disadvantage and that is that at the end of the charging process (that is to say, when the solution is depleted of halide and enriched with free halogen, whose water solubility is enhanced by the residual ionized halide), there is a strong chemical attack by the electrolyte on the cathode which reduces the efficiency of the charging process; above a certain percentage of dissolved halogen there is an equilibrium between the quantity of zinc which is electrodeposited and the quantity of zinc which is corroded off.

BRIEF SUMMARY OF THE INVENTION

These disadvantages are eliminated by assuring circulation of the electrolyte during operation, by eliminating contact between cathode and electrolyte during periods of battery inactivity, and according to the present invention, by adding to the aqueous zinc halide solution:

(1) salts with very mobile ions, capable of assuring the solution a high electrical conductivity,
(2) an organic solvent, insoluble in water, which is capable of retaining the free halogen produced during the charging process,
(3) a salt soluble in the aqueous electrolyte which allows the exchange of zinc halide (which is formed in the discharge process) according to the following reaction:

I           $ZnA + MY \rightleftharpoons ZnY + MA$ to obtain a zinc salt and another metallic halide, both compounds to be only slightly soluble and yielding a precipitate. MY represents the soluble salt and A the halide.

DESCRIPTION OF THE DRAWINGS

FIG. 1 is a schematic cross section through plane I—I of FIG. 2,
FIG. 2 is a cross section through plane II—II of FIG. 1.

DESCRIPTION OF THE INVENTION

The soluble exchange salt MY of Equation I can be a salt with highly mobile ions which accomplishes two of the above additive functions (assuring good electrical conductivity and exchanging the zinc halide). Exchange salts with highly mobile ions are, for example, $Cs_2SO_4$ and/or $NH_4Cl$. High mobility of these ions make good electrical conductivity possible. The electrolyte is said to have a high electrical conductivity when this is approximately equal to that of the ordinary sulphur or alkaline solutions usually employed in batteries, that is, approximatly 400–500 mohm $cm.^{-1}$.

In the case of $NH_4Cl$, the conductivity in an aqueous solution is approximately 420 mohm $cm.^{-1}$ (at 25° C.). This value drops to about 300 mohm $cm.^{-1}$ in the presence of the $ZnBr_2$ which is formed during the charging process (that is, when there is 100% $ZnBr_2$ in $H_2O$).

Therefore, the introduction of highly mobile ions, by means of the salts, into the solution, causes a rise in electrical conductivity.

The organic solvent should be insoluble in water and capable of retaining the free halogen produced in the charging process according to its partition coefficient. Accordingly, selection of such a solvent is a simple matter and for example benzene or toluene can be used.

It is advantageous if the organic solvent and the precipitate are electrical insulators. This allows them to be gathered in a common receptacle into which each element of the battery discharges the circulating electrolyte.

Bromine is a halogen which lends itself exceptionally well to function as the dissolved anode, both because it is a liquid at atmospheric temperature and pressure and because of its low cost.

The most commonly used nonreactive electrode substance is graphite. Other materials (Pt or Au, for example) may be used, provided that they do not react with $Br_2$.

The soluble exchange salt $Cs_2SO_4$ has proved to be the most efficient in view of the high mobility of its ions. Reaction I stated above would then be:

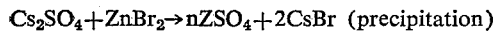

$$Cs_2SO_4 + ZnBr_2 \rightarrow nZSO_4 + 2CsBr \text{ (precipitation)}$$

It has also been found that $Cs_2SO_4$ and $NH_4Cl$ can be advantageously used together. A typical concentration in an aqueous solution of $ZnBr_2$ would be:

For a fully charged battery about 10% $ZnBr_2$, 30% $Cs_2SO_4$, 30% $NH_4Cl$

For a fully discharger battery, in the region of 100% $ZnBr_2$, 30% $CsBr$ (precipitation), 30% $NH_4Cl$ The EMF of the element when using bromine is approximately 1.82 volts; the theoretical specific energy (that is to say, counting only the active ingredients) is approximately 360 watt hours/kg., the specific energy obtained in practical batteries of this type, which have more than 50 elements in series is approximately 120 watt hours/kg. and 120 watt hours/cubic decimeter (in lead oxide-lead batteries the specific energy is approximately 25 watt hours/kg.).

As can be seen in the illustrations, the storage battery is made up of a series of elements 1 separated by walls 11 and containing, laid out face to face, the cathodes 3 and the nonreactive electrodes 4. Each cathode 3 is an intimate electrical contact with electrode 4 of the adjacent cell.

Each element is provided (in its lower portion) with a discharge conduit 7 which is connected to a common receptacle 8 which contains, on the bottom an organic solvent 9 whose purpose is to retain the halogen. The precipitate 10 formed during discharge by the exchange reaction between the zinc halide and the exchange salt is also deposited in receptacle 8. The electrolyte 2 is also contained in receptacle 8 in such a manner that the elements 1 remain dry when the storage battery is not being called upon to give electrical discharges.

Attached to receptacle 8 is a suction tube 5 which carries the electrolyte to a pump 6 which distributes it by means of discharge tubes 12 to each element 1.

If bromine has been chosen as the halogen, the battery functions as follows:

(A) Charging process (1) The pump 6 is activated, the aqueous electrolyte solution 2 initially rich in zinc bromide and containing the salt MY, starts to deposit (while passing through the elements 1 zinc on the cathode 3 and to supply bromine to the nonreactive electrode 4, molecular bromine is dissolving in the solution 2.

(2) Solution 2, enriched with molecular bromine, passes through tube 7 into receptacle 8 where it is bubbled into organic solvent 9 which is located at the bottom. Solvent 9 retains bromine, gradually as it is formed, at a ratio constant with the bromine remaining in the water. This ratio is determined by the partition coefficient of the organic solvent being used.

(3) Electrolyte 2, depleted of zinc and bromine, dissolves a portion of preciiptate 10 which is formed during the discharge process and is supplied to the elements 1 by means of the suction tube 5 and pump 6. There it deposits new zinc on the cathode and produces new molecular bromine.

(4) After several passes of the electrolyte 2, the cathode is completely recovered with metallic zinc, bromine is partially retained by the organic solvent, while the salt MY is again in its original form (reaction towards the left in Equation I).

(B) Discharge process (5) Pump 6 is activated, electrolyte 2 fills elements 1, the zinc deposited on the cathode begins to dissolve and to form zinc bromide by reacting with the bromine molecules present in the liquid.

(6) The salt MY reacts with the zinc bromide being formed, producing a zinc salt and a metallic bromide which together form a precipitate 10 which falls into receptacle 8. Electrolyte 2 is enriched with bromine which it removes from solvent 9, this bromine then reacts with zinc.

The quantity of salt MY added is calculated in such a way that, towards the end of the discharge there is no further possibility of exchange with the anion: the liquid 2 is enriched with zinc bromide with an increase of the solubility of bromine retained by the solvent, this tends to let the voltage in each element remain approximately constant.

What is claimed is:

1. An electric storage battery comprising a first zone containing a zinc cathode and an electrode nonreactive with respect to the reaction in the battery; a second zone below said first zone and in communication therewith; said second zone containing as a first layer an aqueous solution of zinc bromide as an electrolyte, cesium sulfate, and liquid bromine, the level of the electrolyte being below the cathode when the battery is not in use, as a second layer an organic solvent capable of dissolving the bromine; means for pumping said aqueous solution from said first layer of said second zone to said first zone whereby to electrolytically connect said zinc cathode with said nonreactive electrode when said battery is in use.

2. The storage battery of claim 1 wherein the organic solvent is selected from the group consisting of benzene and toluene.

3. The storage battery of claim 1 wherein the nonreactive electrode is selected from the group consisting of graphite, platinum, and gold.

4. The storage battery of claim 1 wherein ammonium chloride is included in the aqueous solution.

5. The storage battery of claim 4 wherein the organic solvent is selected from the group consisting of benzene and toluene, and the electrode is selected from the group consisting of graphite, platinum and gold.

References Cited

UNITED STATES PATENTS

| | | | |
|---|---|---|---|
| 2,773,786 | 12/1956 | Jobe | 136—155 |
| 3,236,694 | 2/1966 | Stenger et al. | 136—100 |
| 3,408,232 | 10/1968 | Blue et al. | 136—30 |
| 3,134,698 | 5/1964 | Neipert et al. | 136—100 |
| 3,285,781 | 11/1966 | Zito, Jr. | 136—14 |
| 3,328,202 | 6/1967 | Riffe | 136—22 |
| 3,373,058 | 3/1967 | Bloch | 136—83 |
| 3,382,102 | 5/1968 | Zito, Jr. | 136—30 |

ANTHONY SKAPARS, Primary Examiner

U.S. Cl. X.R.

136—155